United States Patent [19]
Grace

[11] 3,954,250
[45] May 4, 1976

[54] REMOTELY CONTROLLED CRANKCASE OIL DRAIN VALVE

[75] Inventor: Michael H. Grace, Terry, Miss.
[73] Assignee: Paul E. Bradshaw, Jackson, Miss.
[22] Filed: Jan. 14, 1975
[21] Appl. No.: 541,066

[52] U.S. Cl............................ 251/144; 251/294; 251/288; 137/351; 184/1.5
[51] Int. Cl.².............................. F16K 31/46
[58] Field of Search .......... 251/144, 294, 286, 288, 251/315; 137/351; 184/1.5

[56] References Cited
UNITED STATES PATENTS

| | | | |
|---|---|---|---|
| 1,105,090 | 7/1914 | Metzger | 251/294 |
| 1,496,610 | 6/1924 | Shepard | 251/294 X |
| 1,995,174 | 3/1935 | Gerrard et al. | 251/144 X |
| 3,664,633 | 5/1972 | Schaffner | 251/294 |
| 3,677,369 | 7/1972 | Schramm | 251/315 |
| 3,860,032 | 1/1975 | Rogers | 251/315 |
| 3,874,478 | 4/1975 | Mantell, Jr. | 251/144 |

Primary Examiner—William R. Cline
Attorney, Agent, or Firm—B. P. Fishburne, Jr.

[57] ABSTRACT

A two position drain valve or cock is installed permanently in the threaded drain plug opening of an automotive crankcase. The spherical rotary valve element is operated by a crank arm arranged exteriorly of the valve casing on a valve actuating rotary shaft. The crank arm is shifted between valve open and valve closed positions by a push-pull cable assembly including a manual lever pivoted to a mounting bracket which is installed under the hood of an automobile at a conveniently accessible location. Detent means is provided to lock the manual lever in a valve closed position. The shipping package containing the apparatus in kit form may be utilized to receive the dirty oil.

7 Claims, 14 Drawing Figures

U.S. Patent   May 4, 1976   3,954,250
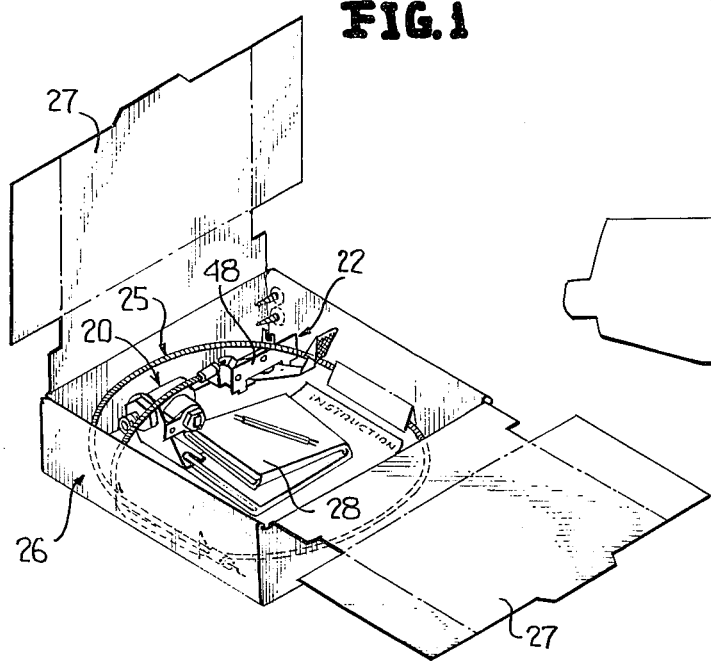
FIG.1
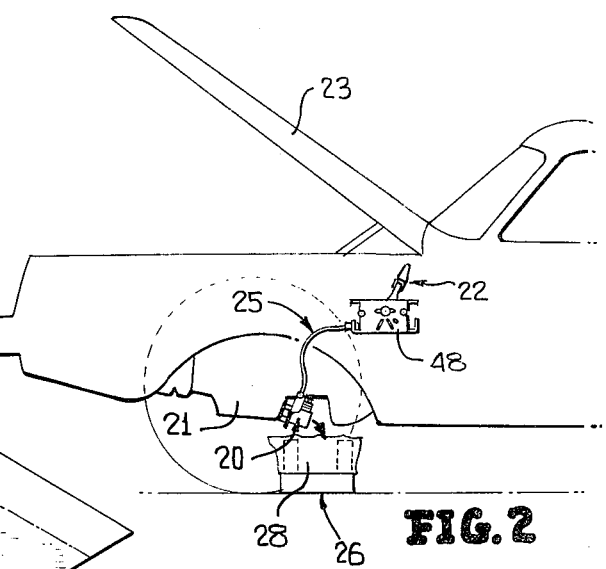
FIG.2
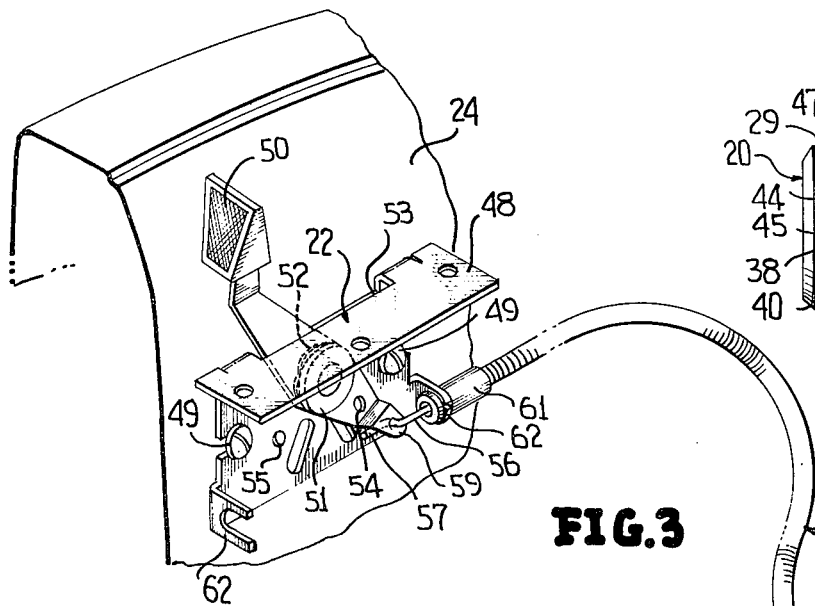
FIG.3
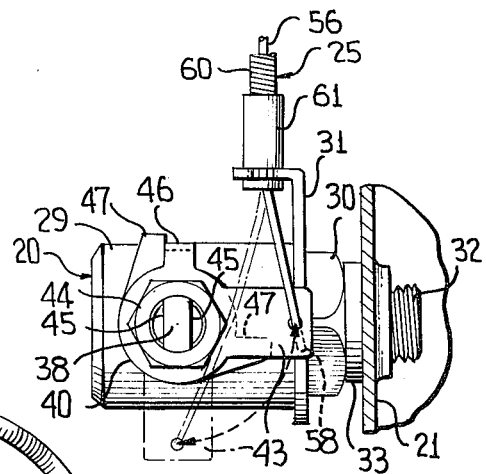
FIG.4
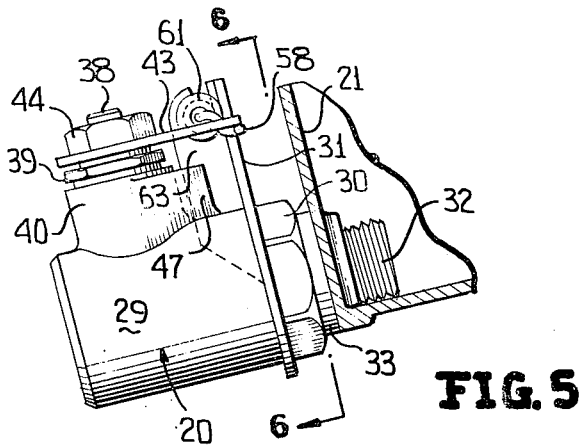
FIG.5
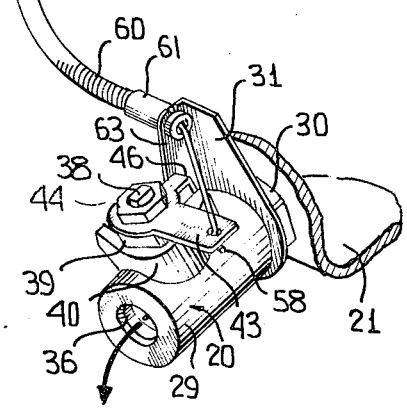

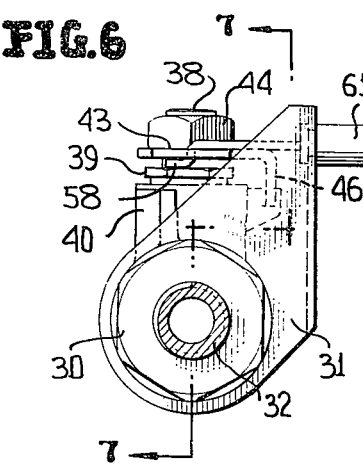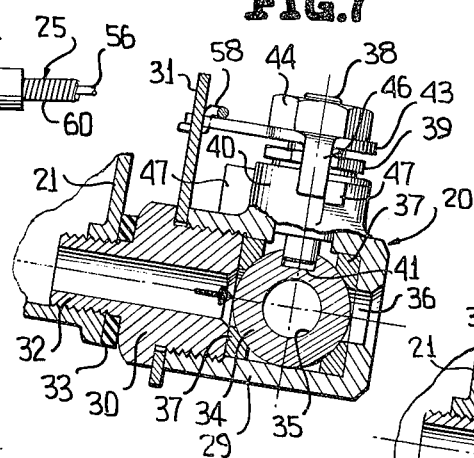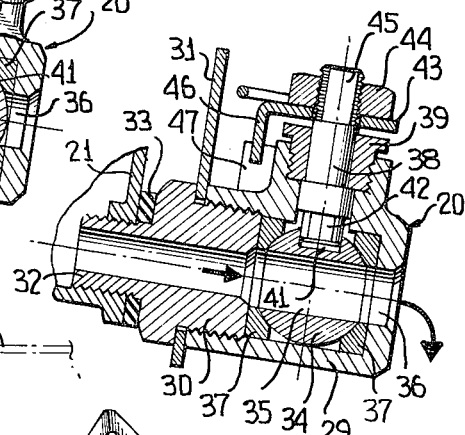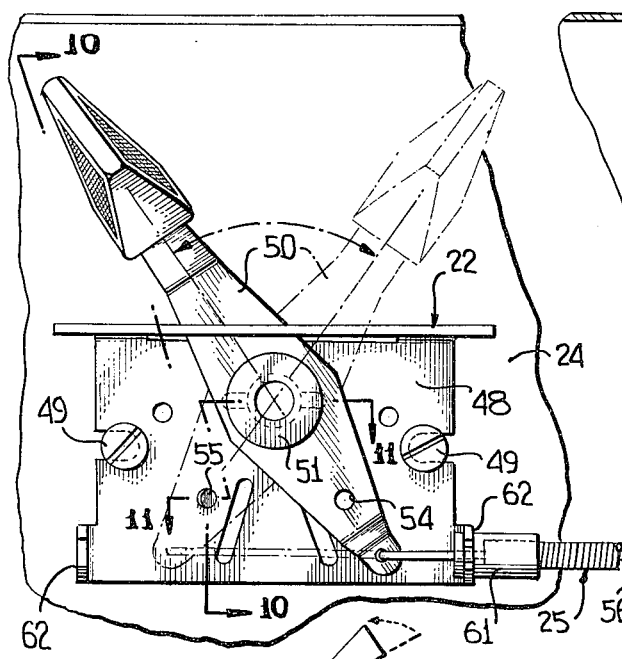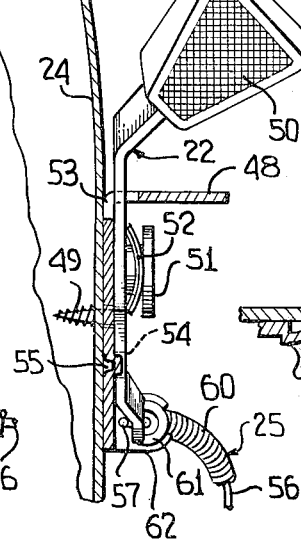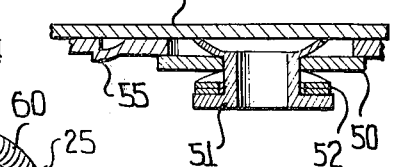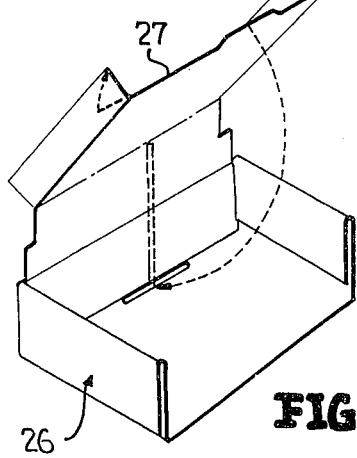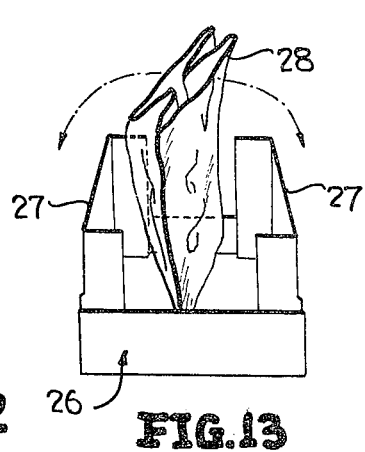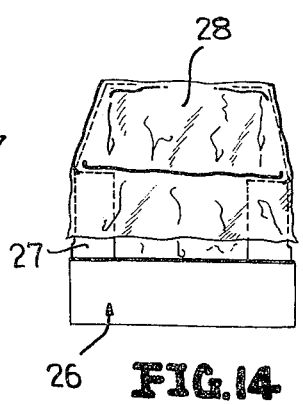

REMOTELY CONTROLLED CRANKCASE OIL DRAIN VALVE

BACKGROUND OF THE INVENTION

The desirability of a motorist being able to conveniently change the crankcase oil in his vehicle has increased dramatically in recent times due to inflation and sometimes unreliable service offered by filling stations. High quality motor oil can be purchased by the motorist in drug or department stores at great savings compared to the inflated prices in most filling stations.

The prior art contains some proposals for devices or attachments to enable the automobile owner to change oil without visiting a filling station, but up to the present time such devices have not been widely accepted by the public. One example of the patented prior art for this purpose is U.S. Pat. No. 3,677,369.

The reason for the lack of public acceptance of this concept lies in excessive cost of prior art devices, lack of reliability and safety of operation, and excessive complexity. The objective of this invention is to provide a device of the above character which is completely practical and reliable in operation, economical to install on the automobile without altering the automobile structure in any way, and completely safe and foolproof in operation. With these features present in the device, it is contemplaed that public acceptance of the idea will be greatly enhanced, resulting in a substantial saving of money to motorists over a period of time, plus the peace of mind resulting from the knowledge that the motor oil has been properly changed and oil of the desired quality has been furnished.

The invention features a number of distinct improvements over the prior art including the ability of the device to be properly mounted on all known car makes and models. The operating lever mounting bracket is universal in that it may be mounted right or left hand and horizontally or vertically beneath the hood of the car. The placement of the control lever beneath the hood renders it relatively non-accessible to children or others who might be tempted to tamper with the apparatus. Where the hood is lockable in the closed position, the security of the invention is further increased. A simple locking arrangement for the manual lever assures that the drain valve plug will be releasably secured in the closed or oil-retaining position. The spherical valve element has very efficient opposing teflon seals to preclude leakage of crankcase oil. Means are provided on both the valve casing and the control lever mounting bracket to securely anchor the end terminals of the push-pull control wire flexible sheath.

Other features and advantages of the invention will become apparent during the course of the following description.

BRIEF DESCRIPTION OF DRAWING FIGURES

FIG. 1 is a perspective view of a package containing the invention in the form of an attachment kit.

FIG. 2 is a side elevational view showing a typical installation of the invention on an automobile, and illustrating the operation of draining the oil into a container formed from the package which originally contained the invention.

FIG. 3 is a perspective view of the installed invention with the device in the valve, open or draining position.

FIG. 4 is a fragmentary elevational view of the drain valve, its operating arm or crank, and the associated push-pull cable operator and anchoring means for the latter.

FIG. 5 is a similar elevational view of the valve taken at right angles to FIG. 4.

FIG. 6 is a cross sectional view taken on line 6—6 of FIG. 5.

FIG. 7 is a cross sectional view through the valve and associated elements taken on line 7—7 of FIG. 6 and showing the valve closed.

FIG. 8 is a further cross sectional view similar to FIG. 7 showing the oil drain valve open.

FIG. 9 is an enlarged side elevational view of the manual operating handle for the device.

FIG. 10 is a cross sectional view taken on line 10—10 of FIG. 9.

FIG. 11 is a cross sectional view taken on line 11—11 of FIG. 9.

FIGS. 12, 13 and 14 are a series of views illustrating the formation of a dirty oil receptor formed from the shipping package containing the invention in attachment kit form.

DETAILED DESCRIPTION

Referring to the drawings in detail, wherein like numerals designate like parts, the device embodies a drain valve assembly 20 for permanent installation on the vehicle crankcase 21 and a manual control lever assembly 22 for installation at a convenient location beneath the hood 23 of an automobile, such as on the inner side of one fender panel 24. A third component of the invention consists of a push-pull cable assembly 25 interconnecting the control lever assembly and the valve assembly, as will be fully described.

In addition to the oil draining mechanism proper embodied in the assemblies 20, 22 and 25, above-mentioned, a further feature of the invention lies in the utilization of the shipping carton 26 for the mechanism as a receptor for the dirty oil being drained from the crankcase. The formation of such a receptor from the carton 26 is illustrated in FIGS. 2 and 12 through 14, where hinged side flaps 27 on the carton are erected as in FIG. 13 to support the top of a flexible plastic bag 28 provided in the package containing the invention. This arrangement enables the motorist to dispose of the dirty oil in a highly convenient manner and without spilling it. The liquid-tight bag 28 may be tied off and discarded with the dirty oil and a fresh bag is employed with each oil change. The invention is in no way limited to the use of the particular oil disposal means illustrated and any other convenient means may be employed, if desired.

Continuing with the description of the mechanism proper, the drain valve assembly 20 comprises a casing 29 having a threaded tubular plug 30 secured in one end thereof with the hexagonal head of this plug tightly clamping a push-pull cable anchor bracket 31 against the adjacent end face of the valve casing. The tubular plug 30 has a reduced diameter threaded nipple extension 32 received in the customary threaded drain plug opening of the crankcase 21, as shown in the drawings. A compressible washer 33 is interposed between the wall of the crankcase 21 and the hexagonal head of the threaded plug 30. The bore of the plug 30, therefore, places the exterior of the crankcase 21 in direct communication with the drain valve assembly 20.

The drain valve assembly further comprises a rotary spherical valve plug or element 43 having a through port 35 adapted for alignment in one position with the bore of plug 30, FIG. 8, and adapted in a second right angular positon to close the bore of the plug 30, FIG. 7. The end wall of valve casing 29 has an outlet opening 36 adapted to register with the valve plug bore 35 when the latter is turned to the open or drain position.

The rotary drain valve is very effectively sealed against leakage around the plug 34 by a pair of opposing preferably teflon discs or seals 37 on opposite sides of the rotary plug 34 in the chamber of the valve casing.

The spherical plug 34 is turned from its closed to its open position by a short shaft 38 dispoded at right angles to the axis of the valve casing 29 and plug 30 and rotatably held in a threaded fitting 39 contained within an extension 40 of valve casing 29. The interior end of the shaft 38 is received in a recess 41 of the valve plug 34, and engaging flats 42 on the shaft and in the recess 41 prevent relative rotation of the plug 34 and shaft 38, so that these elements will turn as a unit in the operation of the valve.

A crank arm 43 for turning the shaft 38 is provided, and this crank arm is clamped against a shoulder provided on the shaft 38 by a clamping nut 44. The crank arm 43 has flats provided in its opening which fits over the top of shaft 38 and these flats cooperate with opposing flats 45 on the shaft 38 to assure that the crank arm will not turn relative to the shaft. The arrangement of the flats also allows the crank arm 43 to be installed in either of two positions on the shaft 38 to render the mechanism more flexible and more adaptable in terms of differing vehicles. The movement of the crank arm 43 with the shaft 38 and valve plug 34 is limited between two right angular positions by the engagement of a depending stop extension 46 on the crank arm with a pair of fixed stops 47 on the casing 29 in 90 degrees spaced relation, as clearly shown in FIG. 4. When the stop element 46 engages one of the stops 47, the drain valve will be closed, FIG. 7, and when it engages the stop 47, the valve will be open, FIG. 8. This assures reliability in the operation of the drain valve in the movement of the plug 34 between the open and closed positions.

The assembly 22 comprises a sturdy stamped metal mounting bracket 48 which may be attached by screws 49 in the interior fender panel 24, or in any other convenient location under the hood of the automobile. In this connection, the mounting bracket 48 is versatile in its design, in that it may be mounted horizontally as shown in the drawings, vertically, and either right or left hand in relation to the automobile and the associated components of the device.

A manual operating lever 50 is pivoted intermediate its ends to the mounting bracket 48 by a stud or rivet 51. Spring washers 52 beneath the head of the rivet 51 bear against and urge the flat body of the lever 50 against the plate body of the mounting bracket 48. The lever 50 extends through a clearance slot 53 formed in the top of bracket 48. As shown in FIG. 10, the manual lever may lie close to the adjacent fender panel 24 for the sake of compactness and to avoid cluttering of the engine space beneath the hood.

The pivoted lever 50 is swingable between two positions, FIG. 9, which lever positions correspond to the open and closed positions of the valve plug 34. When this plug is closed, FIG. 7, the manual lever 50 is in the broken line position, FIG. 9, and for the sake of safety is releasably locked in this position by a simple detent means consisting of an aperture 54 in the lever near its lower end which receives a small raised projection 55 on the mounting bracket 48. These elements snap into interlocking engagement whenever the lever 50 is shifted to the valve closed position. No locking detent means for the lever is necessary or desirable when the lever is in the valve open position shown in full lines in FIG. 9 and also shown in FIG. 3.

In order to transmit the motion of the lever 50 into a corresponding movement of the crank arm 43 on the valve, a motion transmitting means in the form of the push-pull cable assembly 25 is provided. This assembly comprises a push-pull wire 56 whose deformed terminal ends 57 and 58 are connected, respectively, with an offset end extension 59 of manual lever 50 and an aperture near the free end of the crank arm 43. In this way, movement of the lever 50 on its pivot will directly transmit a like movement to the crank arm 43 of the rotary shaft 38 to open or close the drain valve. The push-pull wire 56 is constrained by a conventional sheath 60 whose button-like end terminals 61 are engaged, respectively, in one of a pair of slotted arms 62 on the mounting plate 48 and a similarly slotted flange 63 of anchor bracket 31 carried by the valve assembly. The second slotted arm 62 on the plate or bracket 48 is available for an opposite hand hook-up of the mechanism where desirable. The two buttons 61 of the push-pull cable assembly are thus firmly yet detachably anchored to the respective elements 48 and 31 so that the entire assembly is very secure and reliable.

In light of the above description taken with the drawings, it is thought that any further description of the structure and its mode of operation would be superfluous to a proper understanding by anyone skilled in the art.

It is to be understood that the form of the invention herewith shown and described is to be taken as a preferred example of the same, and that various changes in the shape, size and arrangement of parts may be resorted to, without departing from the spirit of the invention or scope of the subjoined claims.

I claim:

1. Mechanism for draining crankcase oil on an automotive vehicle comprising in combination a drain valve assembly having a threaded nipple adapted for engagement in a crankcase drain plug opening, said drain valve assembly having a casing including an outlet opening and a rotary plug valve element having a through port adapted in one position of the plug to register with the outlet opening, a shaft on the valve assembly at right angles to the axis of the outlet opening and secured to said plug for rotating it to valve closed and valve open positions, a crank arm attached to said shaft externally of said casing and operable to turn the shaft with said plug and having a stop extension, a cooperating pair of stop elements on the valve assembly in spaced relation engageable with the stop extension to arrest movement of the crank arm at two positions corresponding to the valve closed and valve open positions of the plug, a remote mounting bracket adapted for attachment to a structural member of a vehicle in a desired position beneath the hood, a manual lever pivotally mounted on said bracket and swingable to valve closed and valve open positions of said bracket, detent means on the lever and bracket cooperating to releasably hold the lever at the valve closed position, and transmission means interconnecting the lever and said crank arm of the valve assembly, whereby movements of the former produce corresponding movements of the latter to and from said valve open and valve closed positions.

2. Mechanism according to claim 1, and said transmission means comprising a push-pull cable assembly having a push-pull wire with terminal ends attached to said manual lever and crank arm, a cable sheath receiving the push-pull wire slidably and having button end terminals, and slotted bracket elements on said mounting bracket and said valve assembly receiving and holding said button end terminals.

3. Mechanism according to claim 2, and said detent means comprising an aperture in the manual lever on one side of the lever pivot and a cooperating projection on said mounting bracket adapted to interlock with the aperture.

4. Mechanism according to claim 2, and said slotted bracket elements comprising a slotted arm carried by the mounting bracket and a slotted bracket plate secured to the valve assembly.

5. Mechanism according to claim 4, and the valve assembly including a threaded plug carrying said nipple and said slotted bracket plate clamped by said threaded plug against an end face of said valve assembly.

6. Mechanism according to claim 2, and said manual lever and crank arm each being apertured and receiving detachably said terminal ends of said push-pull wire.

7. Mechanism according to claim 1, and said valve assembly further including a casing have a chamber in which the rotary plug valve element is mounted and a pair of seals in said chamber on opposite sides of the plug valve element and having openings adapted to register with the through port of the plug valve element when the latter is positioned at the valve open position.

* * * * *